(12) United States Patent
Ramachandran et al.

(10) Patent No.: US 10,025,856 B2
(45) Date of Patent: Jul. 17, 2018

(54) DYNAMIC LANDING PAGES

(71) Applicant: Target Brands, Inc., Minneapolis, MN (US)

(72) Inventors: Raja Ramachandran, Bloomington, MN (US); Mario Watson, Minneapolis, MN (US); Rajesh Gupta, Minneapolis, MN (US)

(73) Assignee: Target Brands, Inc., Minneapolis, MN (US)

(*) Notice: Subject to any disclaimer, the term of this patent is extended or adjusted under 35 U.S.C. 154(b) by 198 days.

(21) Appl. No.: 13/917,957

(22) Filed: Jun. 14, 2013

(65) Prior Publication Data

US 2014/0372400 A1    Dec. 18, 2014

(51) Int. Cl.
*G06F 17/30* (2006.01)

(52) U.S. Cl.
CPC .............. *G06F 17/30864* (2013.01)

(58) Field of Classification Search
CPC .................................. G06F 17/30864
USPC ........................................ 707/706
See application file for complete search history.

(56) References Cited

U.S. PATENT DOCUMENTS

| | | | | |
|---|---|---|---|---|
| 7,523,387 | B1* | 4/2009 | Greenwald | G06Q 30/00 705/14.52 |
| 2004/0268228 | A1* | 12/2004 | Croney et al. | 715/505 |
| 2005/0177595 | A1 | 8/2005 | Krieg et al. | |
| 2006/0212804 | A1* | 9/2006 | Jackson et al. | 715/520 |
| 2008/0091685 | A1 | 4/2008 | Garg et al. | |
| 2010/0042635 | A1* | 2/2010 | Venkataramanujam | 707/100 |
| 2010/0114874 | A1* | 5/2010 | Hansson | G06F 17/30864 707/722 |
| 2010/0125604 | A1* | 5/2010 | Martinez et al. | 707/784 |
| 2010/0161605 | A1 | 6/2010 | Gabrilovich et al. | |
| 2010/0174686 | A1 | 7/2010 | Acharya et al. | |
| 2010/0293249 | A1* | 11/2010 | Beaulieu et al. | 709/219 |
| 2011/0029541 | A1 | 2/2011 | Schulman | |
| 2011/0196690 | A1* | 8/2011 | Peles et al. | 705/1.1 |
| 2011/0213655 | A1* | 9/2011 | Henkin et al. | 705/14.49 |
| 2011/0258204 | A1* | 10/2011 | Hubbard et al. | 707/749 |

(Continued)

OTHER PUBLICATIONS

Oracle, "Oracle Endeca Workbench User's Guide Version 3.1.1 Dec. 2012", Dec. 2012, https://docs.oracle.com/cd/E38679_01/ToolsAndFrameworks.311/pdf/WorkbenchUserGuide.pdf.*

(Continued)

*Primary Examiner* — Rehana Perveen
*Assistant Examiner* — Hicham Skhoun
(74) *Attorney, Agent, or Firm* — Merek, Blackmon & Voorhees, LLC

(57) ABSTRACT

At least two key-value pairs are received as part of a uniform resource identifier. A Web page definition is retrieved by a processor based on at least one of the key-value pairs and includes multiple sections of a Web page, wherein at least one section is associated with a key of a second key-value pair of the at least two key-value pairs. The key of the second key-value pair is used to select a set of section objects that each have content that can be placed in the section associated with the key. If a section object is located that has been assigned the value of the second key-value pair, content defined for the located section object is placed in the section. A Web page comprising the content for the section is returned.

5 Claims, 15 Drawing Sheets

(56) References Cited

U.S. PATENT DOCUMENTS

| | | | |
|---|---|---|---|
| 2011/0295683 A1* | 12/2011 | Mak .................. | G06Q 30/0251 |
| | | | 705/14.49 |
| 2012/0059713 A1* | 3/2012 | Galas et al. ............... | 705/14.49 |
| 2012/0143696 A1* | 6/2012 | Kaushik ............. | G06Q 30/0269 |
| | | | 705/14.66 |
| 2012/0173692 A1* | 7/2012 | Lakes et al. .................. | 709/223 |
| 2012/0239667 A1* | 9/2012 | Vysyaraju et al. ............ | 707/749 |
| 2013/0204715 A1* | 8/2013 | Zhang ....................... | 705/14.73 |
| 2014/0189714 A1* | 7/2014 | Lawbaugh .......... | H04L 41/0253 |
| | | | 719/313 |

OTHER PUBLICATIONS

Oracle, "Endeca® Content Assembler, Page Builder Developer's Guide, Version 2.1.x ", Dec. 2011. http://docs.oracle.com/cd/E35643_01/ContentAssemblerNET.212/pdf/PageBuilderDevGuide.pdf.*

Oracle, "Oracle Endeca Workbench User's Guide Version 3.1.1 Dec. 2012", Dec. 2012, retrieved online on Nov. 5, 2013 from http://docs.oracle.com/cd/E38679_01/ToolsAndFrameworks.311/pdf/WorkbenchUserGuide.pdf. (120 pages).

Office Action from Canadian Patent Application No. 2,823,352, dated Nov. 22, 2013 (3 pages).

Product Help—adCenter—How to use query string parameters, http://advertise.bingads.microsoft.com/en-us/product-help/adcenter/topic?market=en-US& . . . , 1 page, Sep. 21, 2012.

Dynamic Landing Pages, Definition and Examples of Dynamic Landing pages, http://seotermglossary.com/dynamic-landing-pages/, 2 pages, Sep. 21, 2012.

Dynamic Content—Documentation Wiki, http://wiki.memberlandingpages.com/dynamic content, 15 pages, Nov. 8, 2012.

Oracle Endeca Commerce, Assembler Application Developer's Guide, Version 3.1.0, Jul. 2012, 186 pages.

Office Action from Canadian Patent Application No. 2,823,352, dated Apr. 2, 2014 (2 pages).

* cited by examiner

```xml
<ContentTemplate xmlns="http://endeca.com/schema/content-template/2008"
  xmlns:editors="editors"
  type="DynamicLandingPageTemplate"  ——302
  id="ThreeByFourWidthLandingPage">  ——304
  <Description>Displays a three quarter width banner.
  </Description>
  <ThumbnailUrl>/ifcr/tools/xmgr/img/template_thumbnails/ThreeByFourWidthBanner.png
  </ThumbnailUrl>
  <ContentItem>
    <Name>ThreeByFourWidthBannerContent</Name>  ——306
308—<Property name="ContentID">
      <String />
    </Property>
  </ContentItem>
  <EditorPanel>
    <BasicContentItemEditor>                                    310
      <editors:StringEditor propertyName="ContentId" label="ContentId" enabled="true"/>
    </BasicContentItemEditor>
  </EditorPanel>
</ContentTemplate>
```

```
<ContentTemplate xmlns="http://endeca.com/schema/content-template/2008"
  xmlns:editors="editors"
  type="DynamicSlotConfiguration"  ─── 402
  id="ThreeByFourWidthBannerConfiguration">  ─── 404
  <Description>Three quarter width Banner collection selection
  </Description>
  <ThumbnailUrl>/ifcr/tools/xmgr/img/template_thumbnails/ThreeByFourWidthBanner.png
  </ThumbnailUrl>
  <ContentItem>
      <Name>ThreeByFourWidthBanner</Name>
406 ─── <Property name="contentCollection"/>
408 ─── <Property name="ruleLimit">
          <String>1</String>
      </Property>
  </ContentItem>
  <EditorPanel>
      <BasicContentItemEditor>
          <editors:DynamicSlotEditor zoneType="ThreebyFourWidthDynamicSlotConfigurations"/
          >                                                                  ─── 410
      </BasicContentItemEditor>
  </EditorPanel>
</ContentTemplate>
```

```xml
<ContentTemplate xmlns="http://endeca.com/schema/content-template/2008"
    xmlns:editors="editors"
    type="DynamicLandingPageTemplate"  ~502
    id="ContextDynamicLandingPageTemplate">  ~504
    <Description>Dynamic Landing Page triggered by Context
    </Description>
    <ThumbnailUrl>/ifcr/tools/xmgr/img/template_thumbnails/
ContextDynamicLandingPageTemplate.png
    </ThumbnailUrl>
    <ContentItem>                                                          ~505
        <Name>DynamicLandingPage</Name>
        <Property name="Navigation">                    ~506
            <ContentItem Type="Navigation" />
        </Property>
        <Property name="SearchResultList">              ~508
            <ContentItem Type="SearchResultList" />
        </Property>
        <Property name="DynamicSlots">                  ~510
            <ContentItemList Type="DynamicSlotConfiguration">
            </ContentItemList>                                             ~512
        </Property>                                              ~505
    </ContentItem>
</ContentTemplate>
```

DYNAMIC LANDING PAGES

BACKGROUND

Search engines accept search queries from users and provide links to documents and pages containing material that matches the search queries. In addition, most search engines return ads and links paid for by third parties that relate to certain search terms in search queries.

The paid links typically take the form of images and text tied to a uniform resource identifier (URI) that has two parts. The first part provides a network address to a document, page, or program and the second part includes a list of parameters/value pairs. The list of parameters/value pairs can be parsed at the network address indicated in the URI to retrieve values for certain parameters. For example, a common parameter provided in the URI is the query terms submitted to the search engine by the user.

The discussion above is merely provided for general background information and is not intended to be used as an aid in determining the scope of the claimed subject matter. The claimed subject matter is not limited to implementations that solve any or all disadvantages noted in the background.

SUMMARY

At least two key-value pairs are received as part of a uniform resource identifier. A Web page definition is retrieved by a processor based on at least one of the key-value pairs, the Web page definition comprising multiple sections of a Web page, wherein at least one section is associated with a key of a second key-value pair of the at least two key-value pairs. The key of the second key-value pair is used to select a set of section objects that each have content that can be placed in the section associated with the key. The set of section objects is searched for a section object that has been designated for the value of the second key-value pair. If a section object is located during the search of the set of section objects, content defined for the located section object is placed in the section. A Web page comprising the content for the section is returned.

A computing device user interface is provided to allow a Web page to be associated with a parameter and value of a uniform resource identifier and to allow a dynamic slot to be assigned to the Web page and a second parameter of the uniform resource identifier to be associated with the dynamic slot. A second computing device user interface is provided to allow slot content to be associated with a value for the second parameter of the uniform resource identifier.

A Web page server has a memory containing Web page descriptions having at least one dynamic slot, each dynamic slot being associated with a key; and dynamic slot landing pages, each dynamic slot landing page being associated with a value for a key and each dynamic slot landing page identifying content for a dynamic slot associated with the key. A processor in the Web page server executes instructions to parse a uniform resource identifier to extract a key and a respective value for the key from the uniform resource identifier and to use the extracted key to identify a collection of dynamic slot landing pages. The extracted value is used to select content from a dynamic slot landing page in the collection of dynamic slot landing pages. The content is inserted in the dynamic slot in a Web page and the Web page is returned.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is an example of a cartridge template.

FIG. 4 is an example of an intermediate cartridge template.

FIG. 5 is an example of a landing page template.

DETAILED DESCRIPTION

Figure 1:
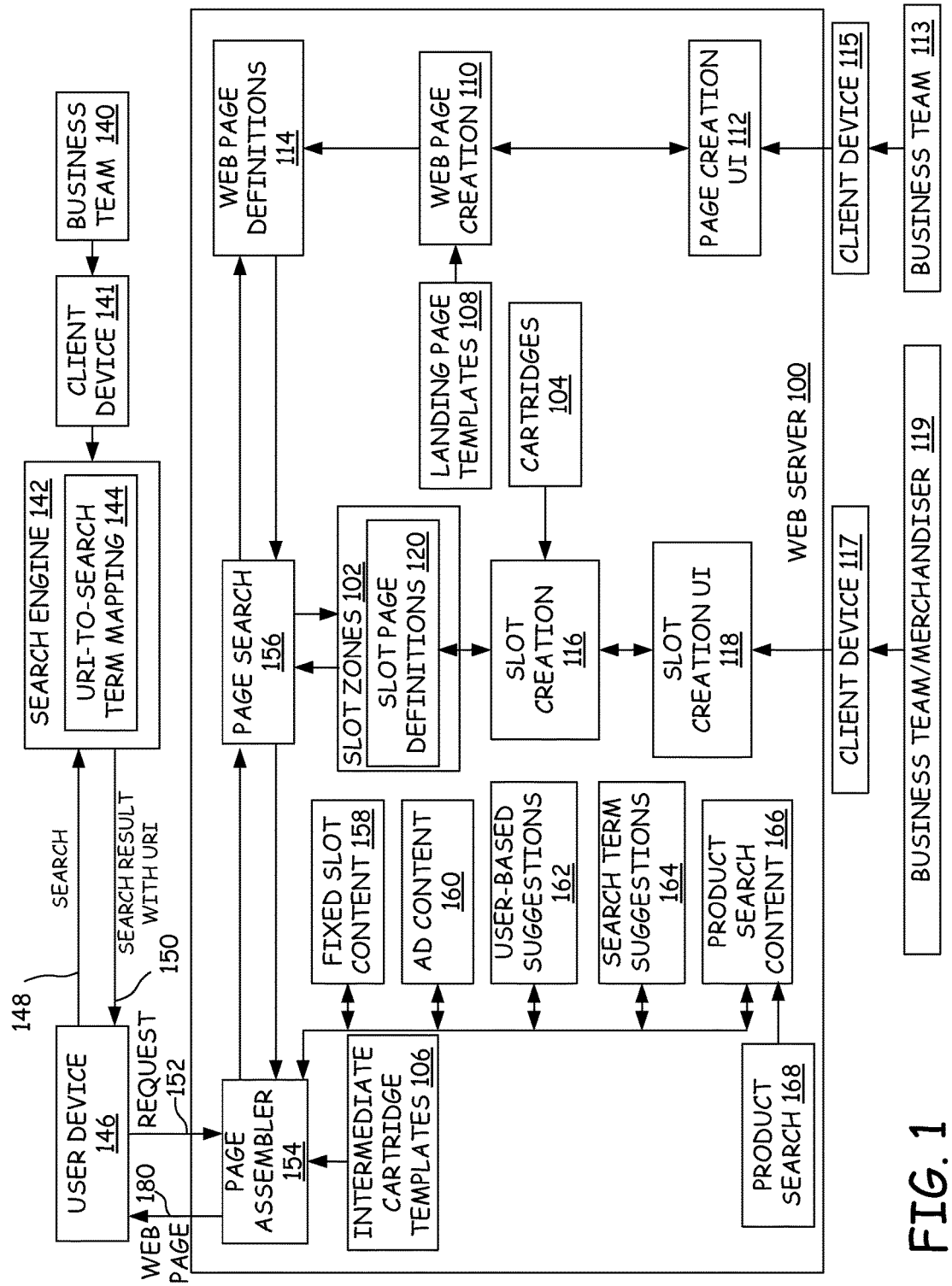
FIG. 1 is a block diagram of elements used in various embodiments.

As described below, this innovation allows non-technical people to construct Web pages from landing page templates and to associate the Web pages with particular parameters and parameter values. In addition, when constructing the Web pages, the non-technical user is able to insert dynamic slots into the Web page and to associate the slots with particular parameters passed within a uniform resource identifier (URI). Separately, a different non-technical user can associate content for a dynamic slot with a particular value of a parameter. This technique produces a collection of slot landing pages for each combination of a dynamic slot and URI parameter. Within the collection, different slot landing pages can be associated with different values of the URI parameter and can provide different content for the dynamic slot.

In further aspects of the innovation, if a parameter associated with a dynamic slot on a Web page is not present in a URI, a page assembler removes the dynamic slot from the Web page and in some cases shifts other slots to fill the position of the missing dynamic slot. In still further embodiments, if a slot landing page has not been defined for a value of a parameter in the uniform resource identifier, the dynamic slot is also removed from the Web page by the page assembler.

Definitions

The following terms are used throughout the application.

A TEMPLATE is a document that defines the sections that may be placed in a Web page or a part of a Web page. The template provides content object definitions that declare properties of a Web page or part of a Web page and how those properties can be configured. Specifically, the template defines what sections or slots may be added to a Web page that is based on the template and how the properties of those sections or slots may be set. A template that describes an entire Web page is referred to as a page template and a template that describes a section of a Web page is referred to as a cartridge template.

A SECTION/SLOT is an area in a Web page or portion of a Web page defined by a template.

A CARTRIDGE includes a template and rendering code for a section of a Web page.

A LANDING PAGE is a Web page returned to a user in response to a uniform resource indicator generated by a search engine based on search terms the user provided to the search engine.

A Uniform Resource Identifier (URI) is a string of characters used to identify a Web resource consisting of a network address and one or more key-value (parameter-value) pairs separated from the network address.

A KEY/PARAMETER is a parameter that may be passed in a URI.

KEY-VALUE PAIR/PARAMETER-VALUE PAIR—a parameter and associated value in a URI such as "cpngroup=Holiday" where "cpngroup" is the parameter and "Holiday" is the value.

A DYNAMIC SLOT is a slot whose content changes based on a value of a parameter in a uniform resource identifier.

A SLOT PAGE DEFINITION/SECTION OBJECT is a description of a section of a web page that identifies content to be used in a slot and the values of a parameter that will trigger the use of the content in the slot.

A SLOT ZONE/ZONE/CONTENT COLLECTION is a collection or set of slot page definitions that all provide content for a same slot based on a same parameter.

A WEB PAGE DEFINITION is a description of a section or sections that have been selected for a Web page from a page template. The description of dynamic slots includes an identification of a zone or a collection of slot page definitions that provide content for the dynamic slot. The Web page definition also includes a primary trigger consisting of one or more parameters and/or parameter values that will cause a Web page definition to be selected when assembling a Web page.

Figure 2:
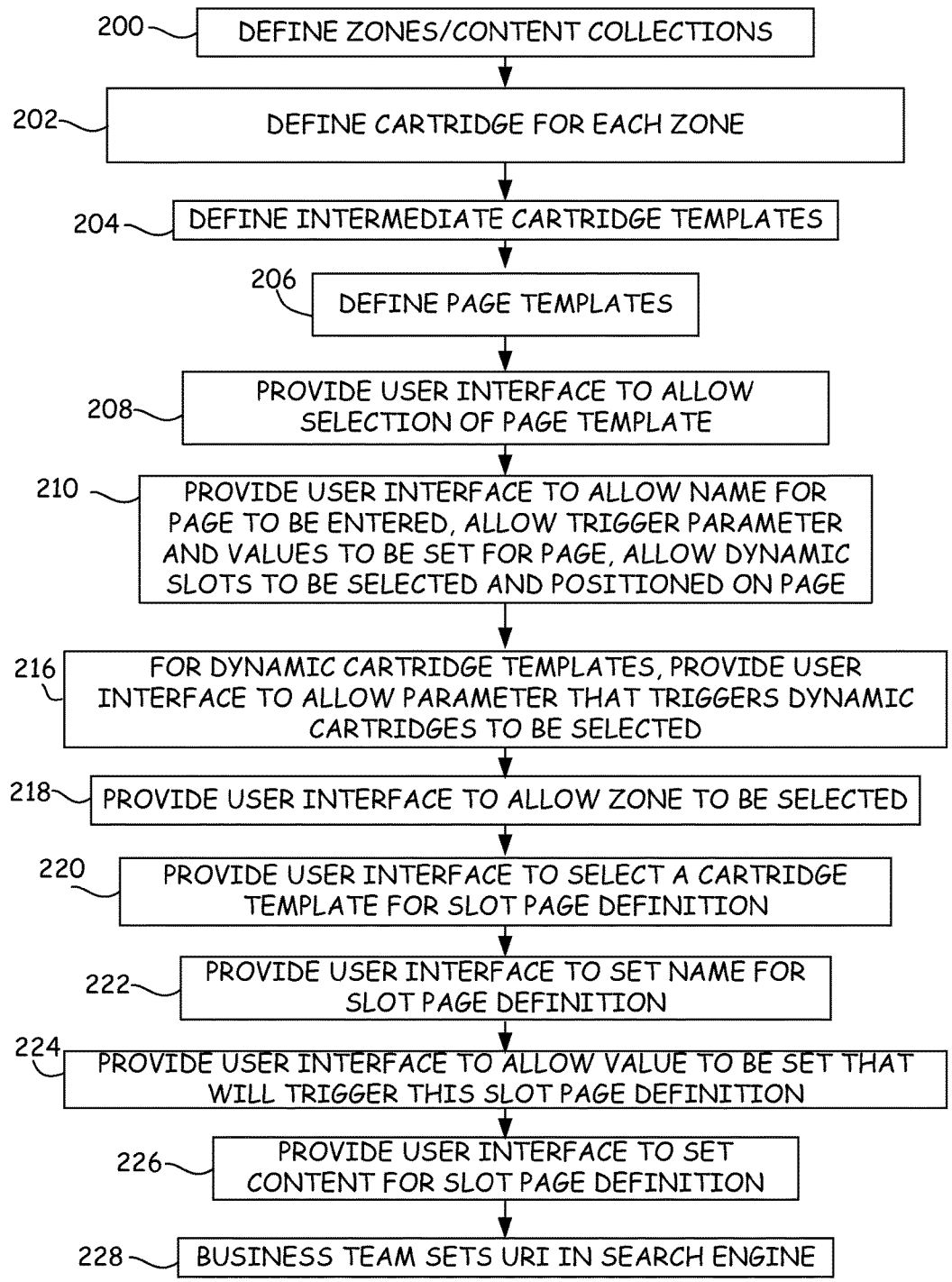
FIG. 2. is a flow diagram of a method of defining landing pages and slot pages.

FIG. 1 provides a block diagram of elements used in various embodiments. These elements are used to allow non-technical users to construct Web pages from templates so that the Web pages include dynamic content based on parameter-value pairs returned by a search engine. These elements also allow dynamic landing Web pages to be constructed based on a URI provided by a search engine. FIG. 2 provides a flow diagram of a method for constructing Web page definitions and slot page definitions.

At step 200, slot zones, also referred to as content collections, 102 are defined in a web server 100. Slot zones 102 are typically defined by providing a name and a zone type for each zone. In the context of the present innovation, each slot zone is provided to accommodate a collection of slot page definitions 120 where each slot page definition within a zone is for a same type of dynamic slot on a Web page and for a same parameter of a URI. For example, a slot zone would be provided for ¾ width banner slots that are associated with an "ad group" parameter. Another slot zone may be provided for ¾ width banner slots for a "campaign group" parameter. Further, another slot zone may be provided for "eSpot" slots that are associated with the "ad group" parameter.

At step 202, cartridges 104 are defined on web server 100 for each slot zone 102. Each cartridge 104 consists of a cartridge template and rendering code. Each cartridge template provides a type for the template, a unique identifier for the template, a display name for the template and controls for allowing a non-technical user to insert a content identifier when constructing a slot page definition.

FIG. 3 provides an example of a cartridge template 300 written in an XML format. Cartridge template 300 includes a type identifier 302 that identifies the type of template being constructed and an ID 304 that uniquely identifies cartridge template 300. Cartridge template 300 also includes a display name 306, which will be displayed in a page builder user interface after the user has selected the template and a property 308 that identifies a property to be set in order to construct a slot page definition from cartridge template 300. In FIG. 3, a single property is provided with the name "content ID." Cartridge template 300 also includes an editor 310 that will be responsible for generating user interface elements to allow a user to enter the content ID for the content that is to fill the slot. In the example of FIG. 3, editor 310 is a string editor that allows the user to enter text in a text field box.

At step 204, intermediate cartridge templates 106 are added to web server 100. Intermediate cartridge templates 106 allow users to select a zone or content collection from a page builder user interface used to construct a Web page definition and provide a link between a web page definition and a slot zone.

FIG. 4 provides an example of an intermediate cartridge template 400 defined in an XML format. Intermediate cartridge template 400 includes a type 402 that identifies the type of template and an ID 404 that provides a unique identifier for this template. Two properties 406 and 408 together indicate that this template provides a content collection and an editor 410 indicates that an editor will provide user interface elements for selecting a content collection. These user interface elements will be provided on a page builder user interface when creating a Web page definition. In particular, editor 410 is a dynamic slot editor with a zone type set to "ThreeByFourWidthDynamicSlotConfigurations," which indicates that the editor should provide a selectable list of zones from which a user may select a single zone. In particular, the selectable list of zones is limited to zones with a zone type of "ThreeByFourWidthDynamicSlotConfigurations." This list of zones can include a separate zone for each URI parameter that has been associated with a ¾ width banner slot.

At step 206, landing page templates 108 are defined on web server 100. Each landing page template defines the sections that may be added to a landing page, where the sections may be positioned within the landing page and parameters that can be set for each section when a Web page definition is constructed from the landing page template.

FIG. 5 provides an example of a landing page template 500 defined in an XML format. Landing page template 500 includes a type 502 that indicates that the template is a page template and not a section template. Page template 500 also includes an ID 504 that uniquely identifies the template.

Within <ContentItem> tags 505, a collection of property tags describe sections that may be added to a Web page definition based on the template. Specifically, a Navigation section 506, a SearchResultList section 508 and Dynamic Slots 510 can be added to the Web page definition. Note that Dynamic Slots 510 is a Content Item List with a type 512 of "DynamicSlotConfiguration" such that any section of the type "DynamicSlotConfiguration" can be added to the Web page definition.

Figure 6:
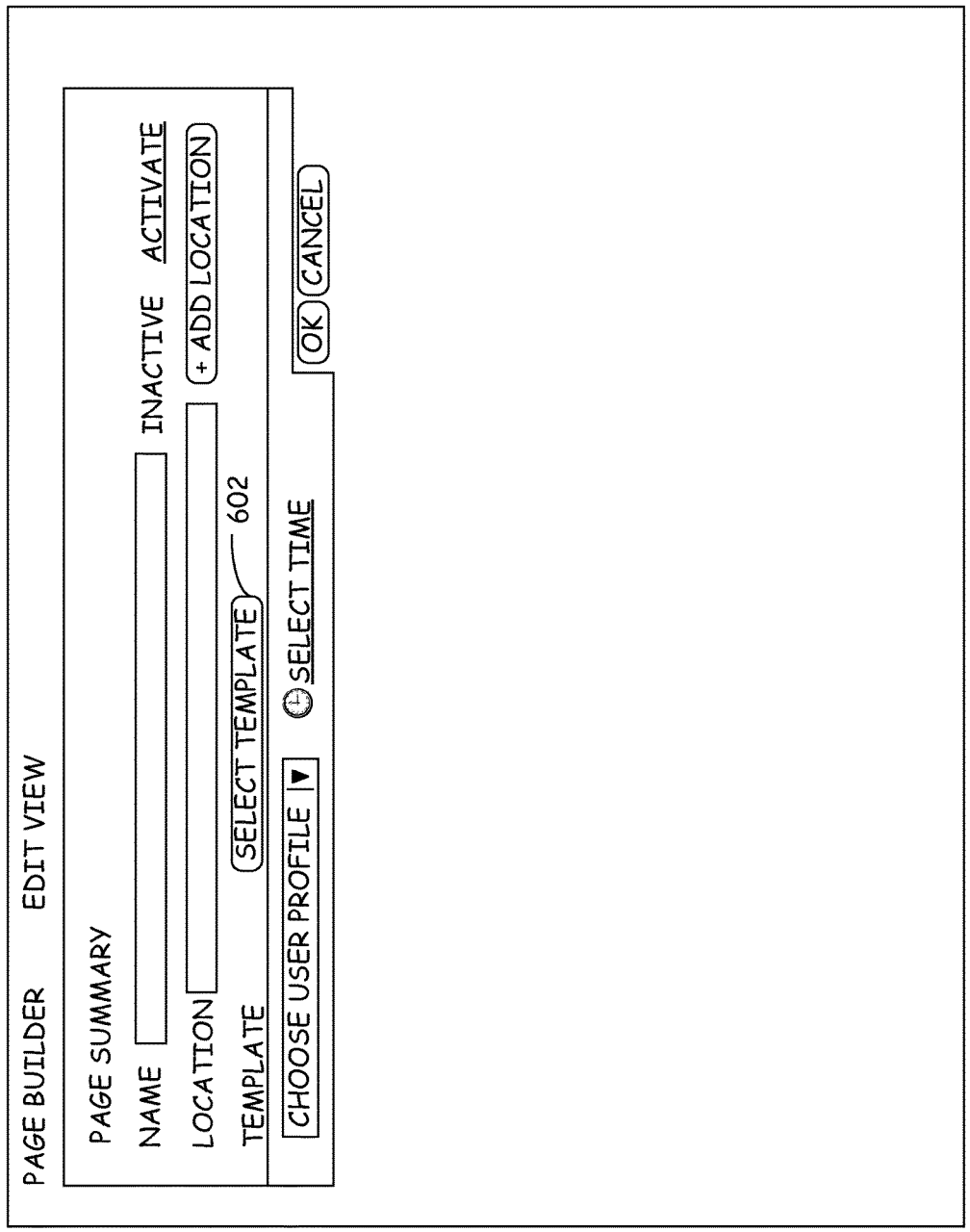
FIG. 6 is an example of a search user interface in an initial state for building a landing page definition.

At steps 208, 210, 212, 214 and 216 a Web page creation module 110, executed by web server 100, provides a page creation user interface 112 that allows a non-technical person such as a member of a business team 113 to define elements of Web page definitions 114. FIG. 6 provides an initial state of an example 600 of user interface 112 that is provided to a client device 115.

Figure 7:
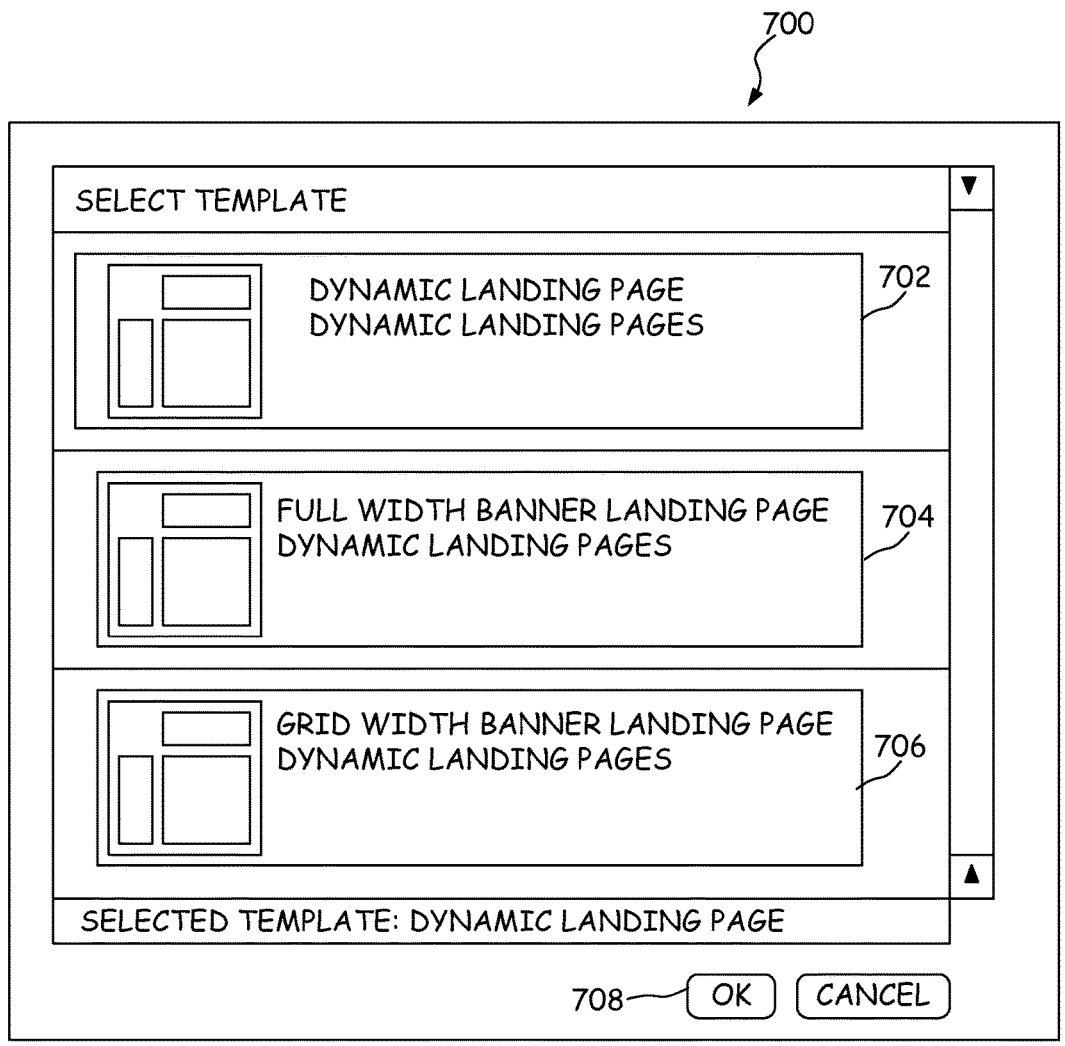
FIG. 7 is an example of a user interface for selecting a template for a landing page.

At step 208, Web page creation module 110 provides page creation user interface 112 so a user is allowed to select a landing page template by selecting Select Template control 602. When Web page creation module 110 receives the indication that control 602 has been selected, it returns a template selection user interface such as user interface 700 of FIG. 7. User interface 700 includes selectable templates 702, 704 and 706. Using an input device on client device 115, the user selects one of the selectable templates 702, 704 and 706 and then selects OK button 708 to assign the template to the Web page definition. The selected template is then shown in template field 804 of user interface 600 as shown in FIG. 8.

Figure 8:
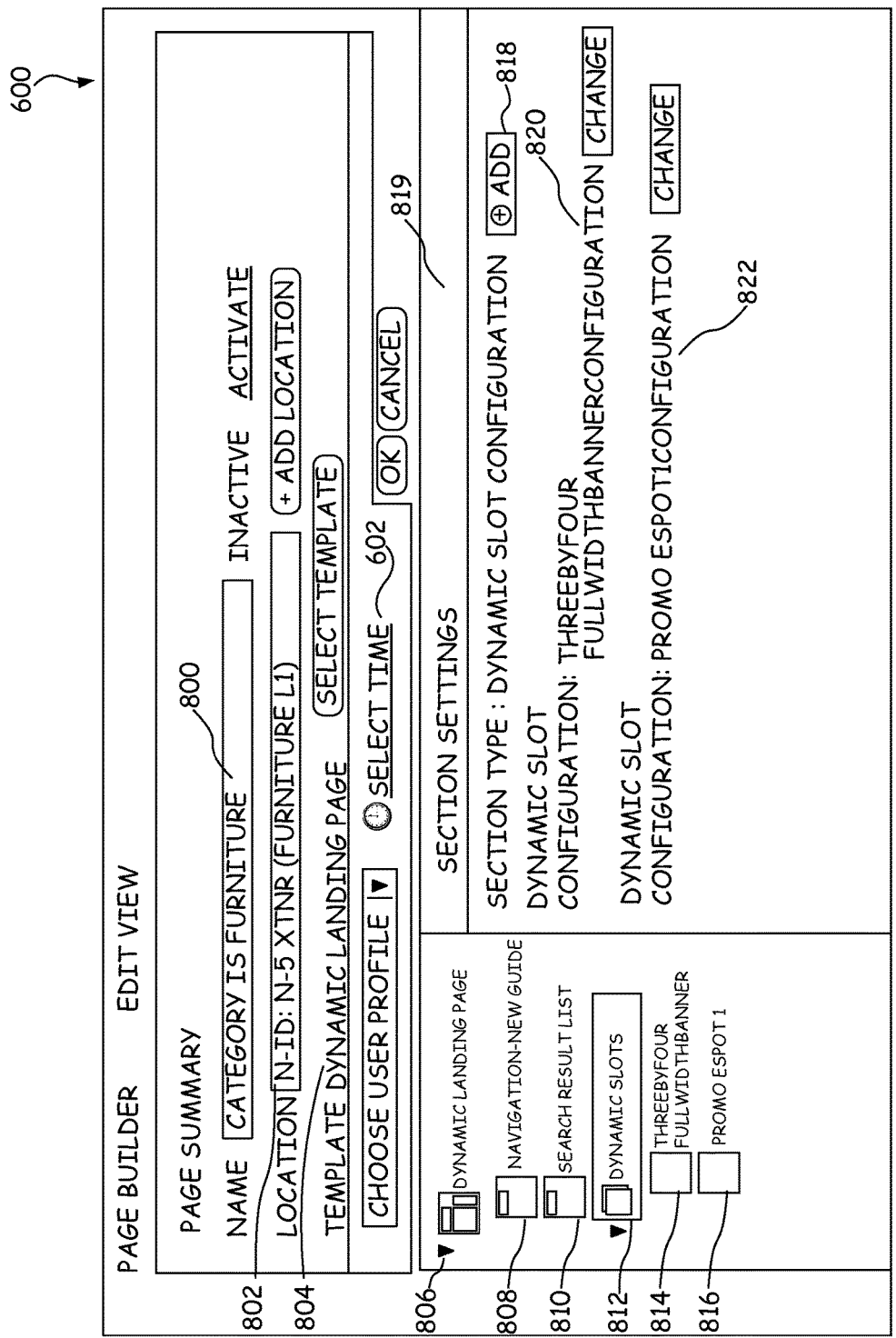
FIG. 8 is an example of a user interface for building a landing page with elements of the landing page having been selected.

At step 210, Web page creation module 110 provides page creation user interface 112 so a name for the Web page definition may be entered in a name field 800 as shown in FIG. 8. Page creation user interface 112 also allows a user to set trigger parameters and values for the Web page in location field 802. The trigger parameters and values describe which parameter-value pairs in the URI will cause the Web page definition to be used to construct a Web page in response to the URI. As shown in field 802, the parameter "N-id" and the associated value "N-5xtnr(Furniture1)" have been set as the trigger for the Web page. In accordance with some embodiments, the trigger set in location field 802 for the Web page is referred to as the primary trigger. Page creation user interface 112 also allows the user to select sections, including dynamic slots, to add to the Web page definition. To add a section, the user selects Dynamic Landing Page control 806 and then an Add control (not shown). As shown in FIG. 8, this process has been performed twice resulting in a Navigation Section and a Search Result List Section being added to the Web page definition as indicated by section selection controls 808 and 810. The Add control can also be used to add a Dynamic Slots control 812, which in turn can be selected to add dynamic slots to the Web page definition. As shown in FIG. 8, Dynamic Slots control 812 has been selected resulting in Dynamic Slot configuration Add control 818 being displayed in section settings area 819. Add control 818 has been selected twice resulting in two dynamic slots being added to the Web page definition as indicated by FullWidthBanner control 814 and PromoEspot1 control 816. In addition, FullWidthBannerConfiguration control 820 and PromoEspot1Configuration control 822 have been added to section settings area 819 to allow the dynamic sections to be configured by the user.

Figure 9:
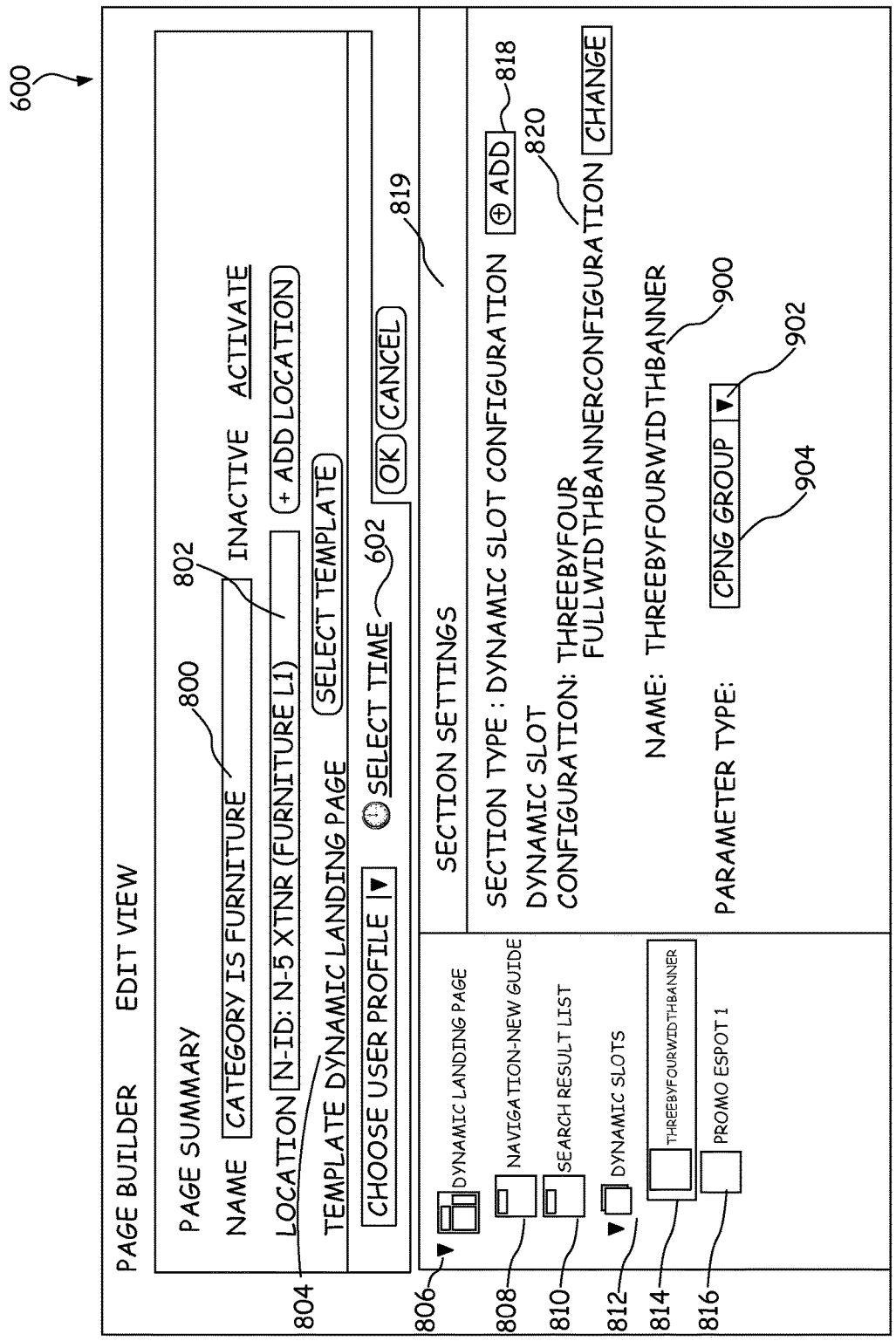
FIG. 9 is an example of a user interface for setting a URI parameter for a dynamic slot in a landing page.

If one of the dynamic slot controls such as slot controls 814, 816, 818 or 820 is selected, Web page creation module 110 modifies user interface 600 so that it includes controls for setting a parameter that will be used to select the content for the corresponding dynamic slot. FIG. 9 provides an example of modified user interface 600 where slot control 814 has been selected. In the user interface, a name 900 of the dynamic slot is provided as "ThreeByFourWidthBanner" and a pull-down control 902 for selecting a parameter 904 is provided.

At step 216, Web page creation module 110 provides page creation user interface 112 so the user is allowed to use pull-down control 902 to select a parameter from a list of possible URI parameters that can be used to select content for dynamic slot 814. The parameters in pull-down control 902 correspond to the slot zones set for the slot type of this dynamic slot. Thus, if there are six possible URI parameters, each slot type, such as FullWidthBanner and PromoEspot1, will have six zones that appear in pull-down control 902. To simplify configuring the dynamic slots, each pull-down menu will display the URI parameters and will not refer to the section-specific zones. However, each pull-down control will programmatically connect to the zones of the respective slot type for which the pull-down control is displayed. For example, in FIG. 9, the pull-down control shows the CpngGroup (Campaign Group) parameter and does not directly reference the ThreeByFourWidthBanner-CpngGroup zone. However, selecting the CpngGroup in pull-down control 904 causes the dynamic slot's content to be selected from content assigned to the ThreeByFourWidthBanner-CpngGroup zone.

After step 216, the Web page definition is complete. The resulting Web page definition provides a Web page layout of sections such as layout 1000 of FIG. 10. The layout includes static or fixed slots such as header section 1002, footer section 1004, fixed slot 1006, fixed slot 1008 and fixed slot 1010. The layout also includes dynamic slots 1112, 1114, 1116, 1118 and 1120, which are each populated with content based on respective parameters in a URI provided by a search engine.

Once the Web page definitions have been set or while the Web page definitions are being set, slot page definitions may be defined that control the content that is placed in dynamic slots. The process of establishing a slot page definition begins at step 218 where a slot page creation module 116 provides a slot creation user interface 118 to computing device 121 to allow a user to select a slot zone within which the slot page definition is to reside. As noted above, the possible zones include a zone for each combination of dynamic slot and URI parameter. Thus, to select a zone, the user selects both a dynamic slot and a URI parameter and then uses the zone established for that combination.

Once the zone is selected, slot creation module 116 modifies user interface 118 to provide a user interface that allows a user 119 to select a cartridge template for the slot page definition at step 220, set a name for the slot page definition at step 222, set a value for the parameter at step 224, and set a content identifier at step 226. As discussed above, the cartridge template defines the type of slot. The parameter value set at step 224 triggers the use of the content represented by the content ID in the slot. When the content identifier has been set at step 226 the slot page definition can be stored as part of the slot page definition collection 120 for the selected zone. Note that a different content identifier can be associated with different URI values within the same zone. For example, a content identifier for content that includes electronic games can be associated with a value of "games" for a URI Category parameter while a content identifier for content that includes children's products can be associated with a value of "children" for the URI Category parameter.

Figure 11:
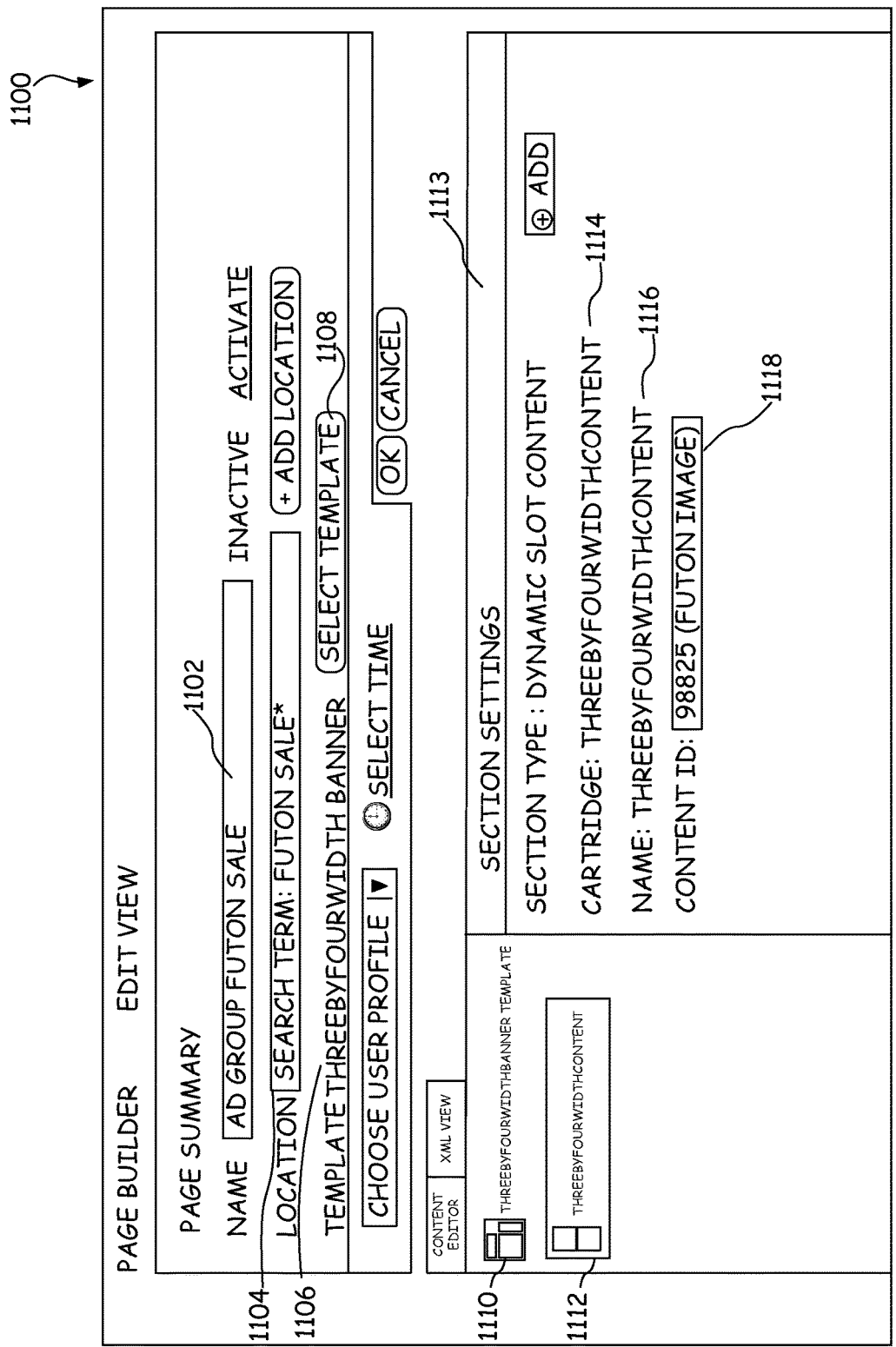
FIG. 11 is an example of a user interface for building a slot page definition.

FIG. 11 provides an example of a user interface 1100, which is an example of user interface 118. In user interface 1100, user 119 has set a name for the slot page description in name text box 1102, has set a value for the parameter in location box 1104, and has selected a cartridge template 1106 using Select Template control 1108. Based on the selection of ThreeByFourWidthBanner template 1106, user interface 1100 also displays ThreeByFourWidthBanner template control 1110 and ThreeByFourWidthContent control 1112. Since ThreeByFourWidthContent control 1112 is selected, section settings area 1113 provides an identifier for the cartridge 1114, a name 1116 for the content and a content ID field 1118 in which user 119 can place an identifier for the content that is to be associated with the slot page description.

At step 228, a business team 140 sets the URI in the search engine by purchasing the rights to have the URI returned to a user when the user submits certain search terms to a search engine 142. Business team 140 may be the same as business team 113 or business team 119 or may be a separate team that specializes in maximizing return for purchases of search terms on the search engine. Within search engine 142, a URI-to-search term mapping 144 is stored to allow search engine 142 to retrieve the URI set by business team 140 for the selected search terms. Mapping 144 may be a rigid mapping or a probabilistic mapping. The URI stored by business team 140 includes at least two parameter-value pairs or key-value pairs where the keys or parameters include terms such as: user query, campaign group, ad group, alternate query, and so forth.

Figure 12:
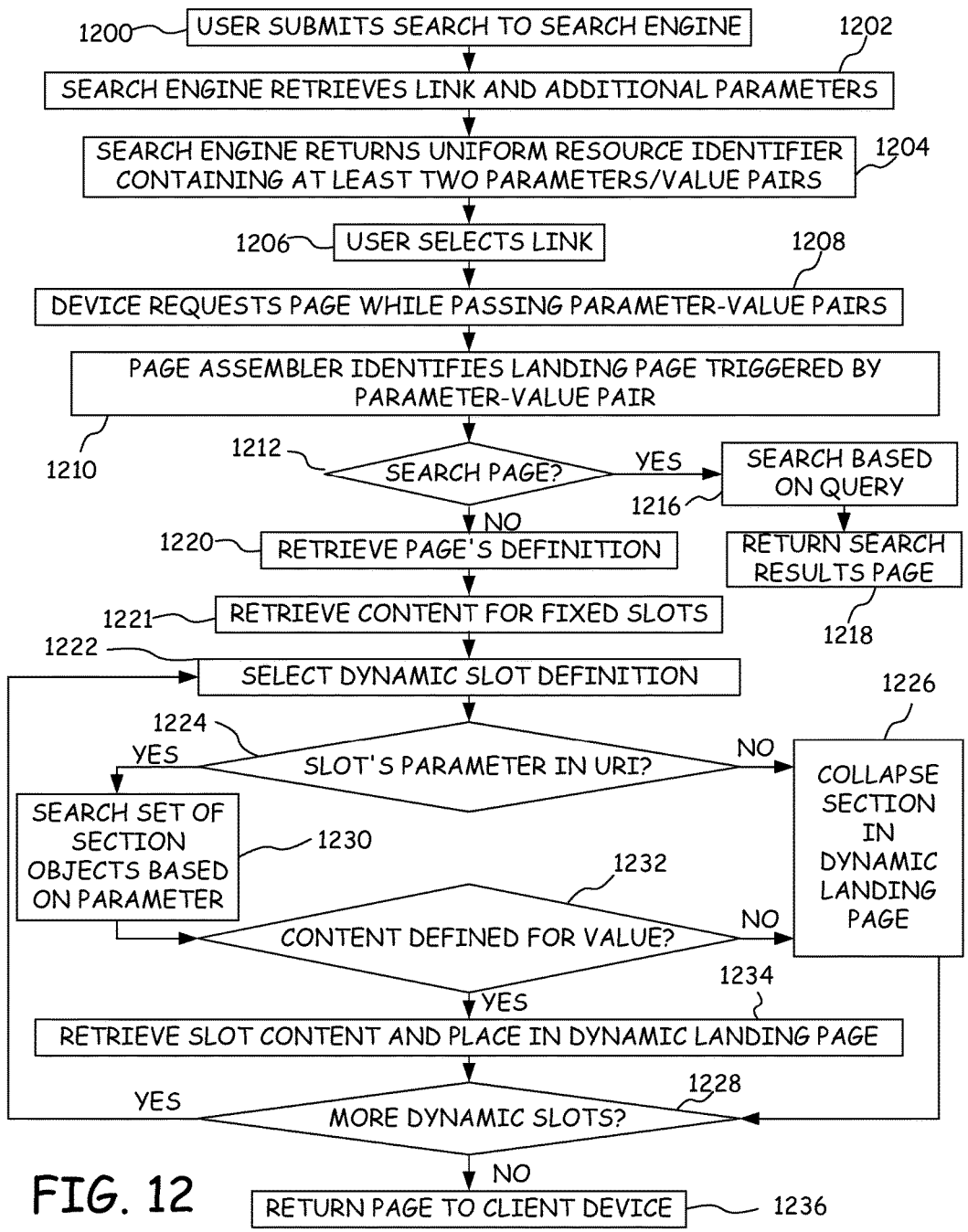
FIG. 12 is a flow diagram for building a landing page based on a URI returned from a search engine in response to a user's search submission to the search engine.

After sufficient Web page definitions and slot page definitions have been created on web server 100, and the URI's have been placed on the search engines, the Web page definitions and slot page definitions may be used to assemble Web pages based on a URI returned from a search engine. FIG. 12 provides a flow diagram of a method of assembling a Web page.

At step 1200, a person performing a search uses a user computing device 146 to submit a search 148 to search engine 142. For example, the person may be looking for a particular video game to buy. Search 148 includes one or more search terms and/or search categories. Based on search 148, search engine 142 retrieves a stored URI containing at least two parameter-value pairs at step 1202 and at step 1204 returns the retrieved URI as part of a search results page 150. The returned search results page 150 is displayed on the user computing device 146 with the retrieved URI appearing as a link on the page. In the displayed search results page, the full URI may be displayed as the link or some other text may be displayed as the link. For example, the search term and/or a retail store name may be displayed as the link. Regardless of the text or image that is displayed as the link, if the link is selected, the URI associated with the link is used to make a request for a Web page.

At step 1206, the person using user computing device 146 selects the link associated with the URI and at step 1208, user computing device 146 sends a request 152 for the page addressed by the URI where the request includes the parameter-value pairs of the URI.

Within web server 100, the request for the Web page and the parameter-value pairs are routed to a page assembler 154. At step 1210, page assembler 154 initiates a page search 156 using the parameter-value pairs to identify a highest ranking Web page definition that is triggered by the request. This ranking involves first identifying every Web page definition that is triggered by the parameter-value pairs. When more than one Web page definition is triggered, a priority ranking of the Web page definitions is consulted to identify the highest-ranking Web page definition.

At step 1212, if the highest-ranking Web page definition is a standard search results Web page, a search is performed at step 1216 using product search 168 to locate products that match the search query value provided by the search query parameter in the URI. Based on the results of this search, page assembler 154 constructs a search result page at step 1218. Because the search result page is only based on a single parameter, the user query, it does not provide a Web page that is as focused or intricate as can be achieved using dynamic slots with additional parameters as discussed further below.

When a standard search page is not returned at step 1212, the Web page definition for the page identified at step 1210 is retrieved at step 1220. At step 1221, content for the fixed slots of the Web page definition is retrieved and added to the Web page by page assembler 154. This can involve retrieving fixed content 158 that does not change such as content for a header and footer. It can also include content that is based on the value of the user's query in the user query parameter. Such content can include advertising content 160, search term suggestions 164, and product search content 166 that results from a product search 168. The content can also include user-based suggestion content 162 if the user's credentials have been provided to web server 100 through a cookie sent to web server 100 or by way of the user previously signing into web server 100.

After the content of the fixed slots has been retrieved, if there are any dynamic slots in the Web page definition, one of the dynamic slots is selected at step 1222. At step 1224, page assembler 154 determines if the parameter or key associated with the dynamic slot in the Web page definition is present in the URI. This involves looking at the zone that was selected for the dynamic slot using pull-down control 902 of FIG. 9. As discussed above, this zone is associated with a parameter in the URI. If the parameter associated with the zone is not present in the URI, the dynamic slot is not included in the Web page by page assembler 154. This effectively removes or collapses the slot at step 1226 and shifts other sections on the Web page, if possible, to fill in the space where the dynamic slot would have been positioned. Once the dynamic slot for the missing parameter has been collapsed, page assembler 154 determines if there are more dynamic slots in the Web page definition at step 1228. If there are more dynamic slots, the process returns to step 1222 to select a next dynamic slot.

When the parameter for a dynamic slot is present in the URI at step 1224, page assembler 154 retrieves and searches the slot page definitions (section objects) 120 of the zone designated for the dynamic slot at step 1230 to determine if any of the slot page definitions 120 are triggered by the value of the parameter. Since each slot page definition contains a value for the zone's parameter and an identifier for content, retrieving the slot page definitions 120 involves retrieving a collection of content for the zone's parameter.

At step 1232, when none of the slot page definitions are triggered by the value in the URI, the dynamic slot is collapsed at step 1226 and page assembler 154 shifts other sections on the Web page, if possible, to fill in the space where the dynamic slot would have been positioned. Thus, the dynamic slot is removed from the Web page if there is no slot content defined for the value of the parameter in the URI.

When a slot page definition is found at step 1232 that is triggered by the value of the zone's parameter in the URI, page assembler 154 retrieves the slot content designated by the content ID in the matching slot page definition at step 1234. Page assembler 154 inserts the retrieved content into the dynamic slot as indicated by the slot page definition and the Web page definition. At step 1228, page assembler 154 determines if there are more dynamic slots in the Web page definition. If the last dynamic slot has been processed at step 1228, page assembler 154 returns the constructed Web page 180 to user device 146 at step 1236.

Figure 10:
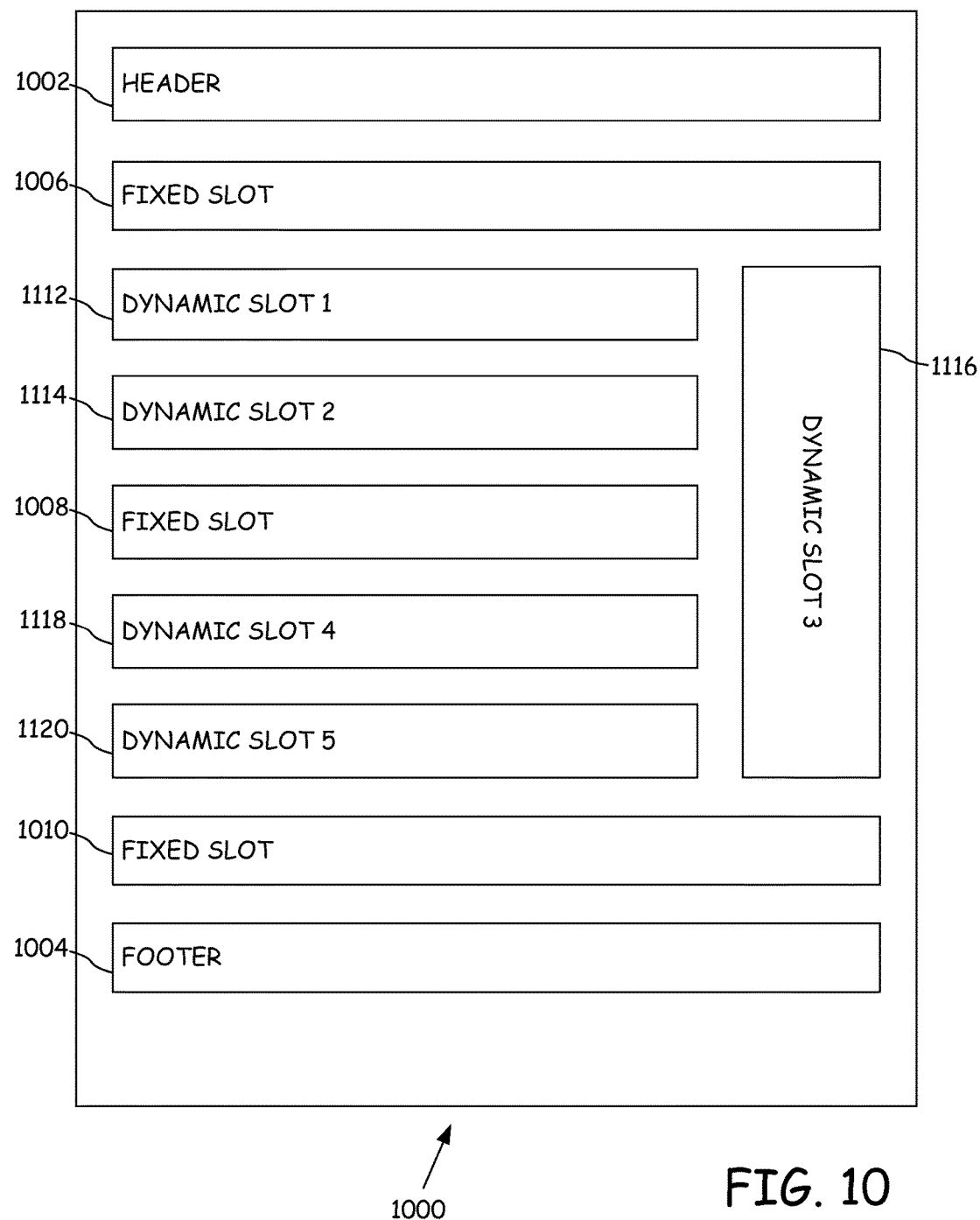
FIG. 10 is an example of a layout for a landing page based on a Web page definition of the landing page.
Figure 13:
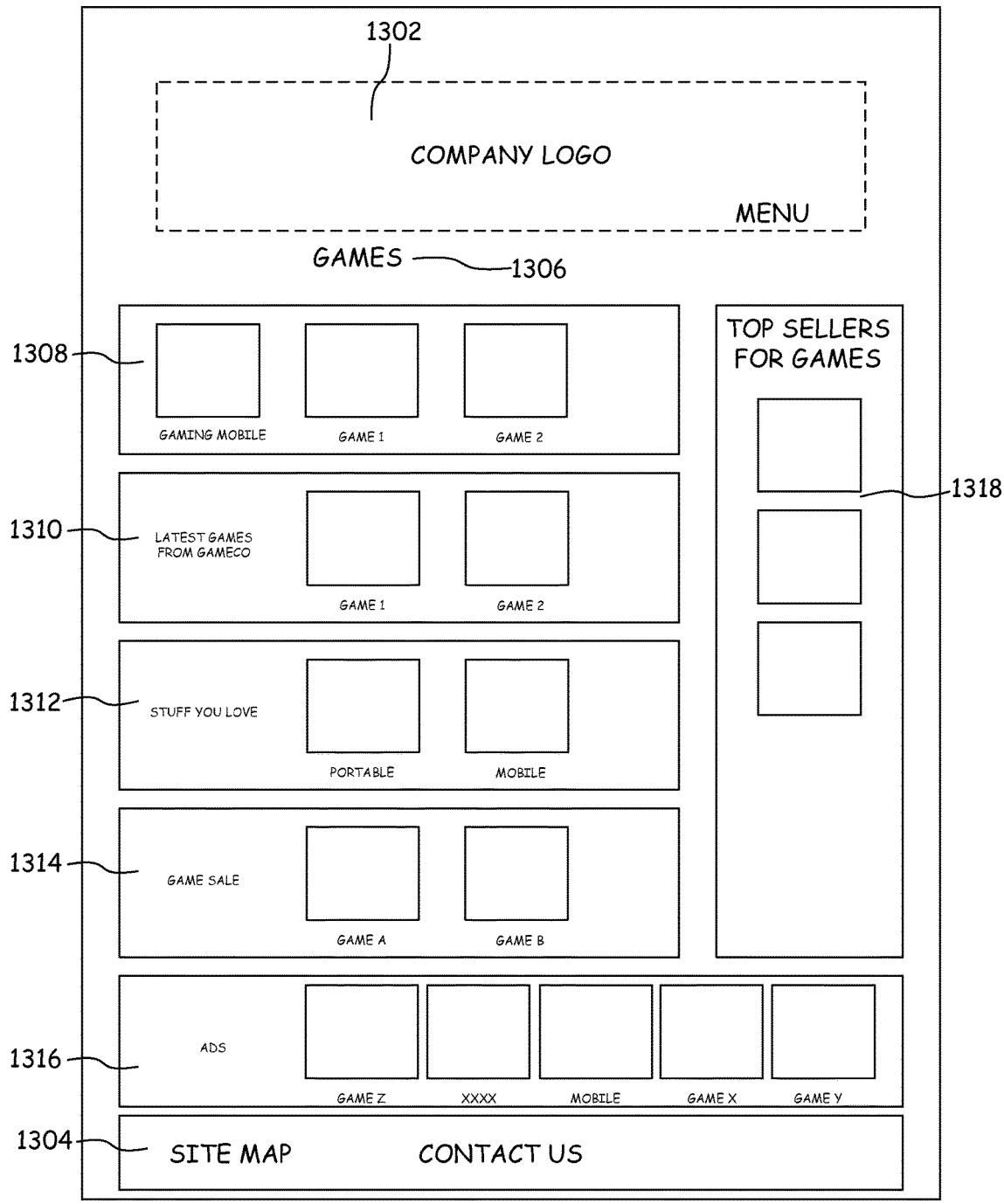
FIG. 13 is an example of a Web page constructed through the process of FIG. 12.

FIG. 13 provides an example of a rendered Web page constructed through the process of FIG. 12 based on the page layout of FIG. 10. As shown in FIG. 13, header 1302, footer 1304, fixed section 1306, fixed section 1312 and fixed section 1316 correspond to header 1002, footer 1004, fixed section 1006, fixed section 1008 and fixed section 1010. Dynamic slots 1308, 1310, 1314 and 1318 of the rendered page correspond to dynamic slots 1112, 1114, 1118 and 1116 of layout 1000. Dynamic slot 1120 is not rendered in page 1300 because either the parameter for the dynamic slot was not present in the URI or the value in the URI for the parameter did not have any associated content defined for it.

Figure 14:
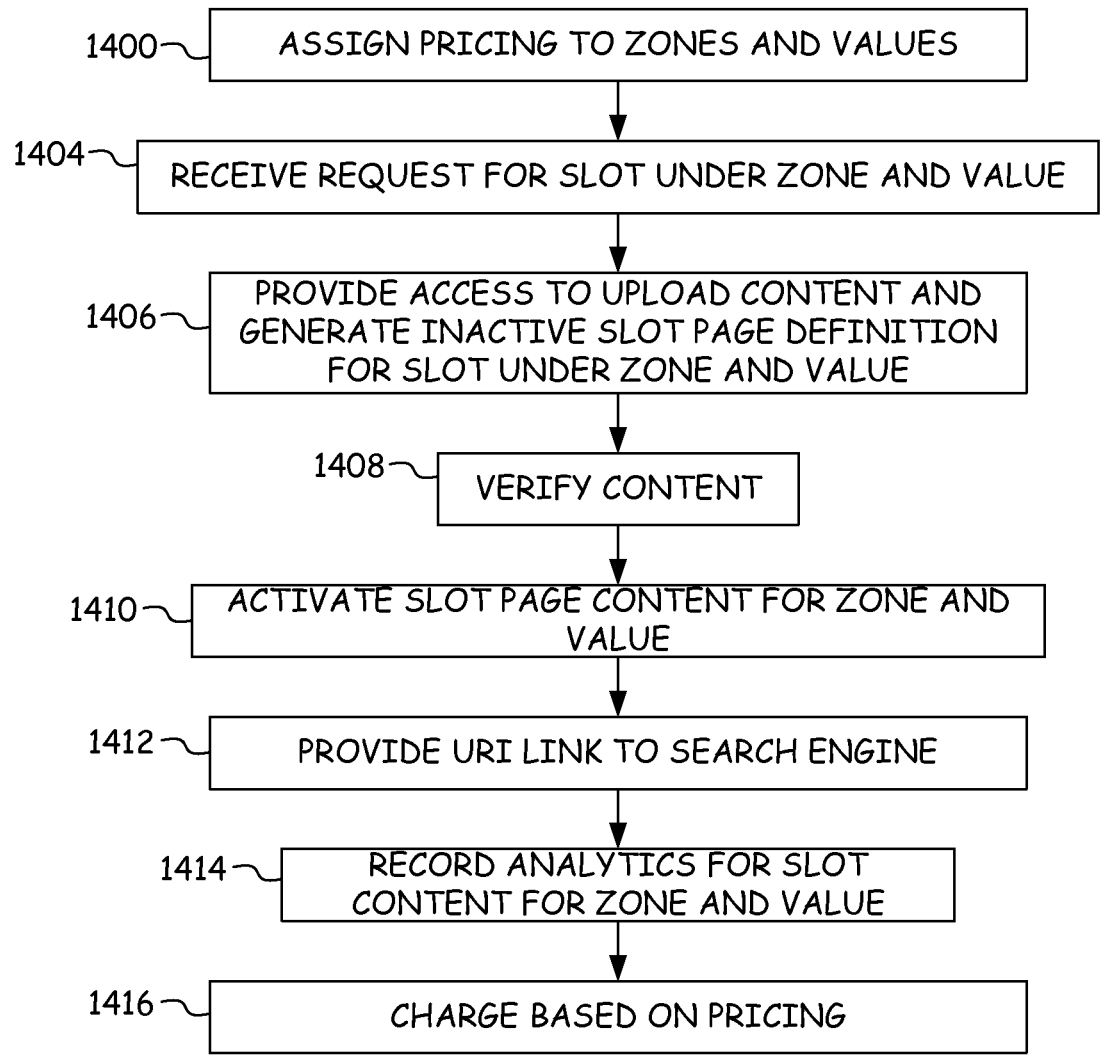
FIG. 14 is a flow diagram of a method of monetizing dynamic slots.

The dynamic slots of the present innovation can be monetized by selling combinations of dynamic slot, parameter, and value to merchandisers who can then set the content for that combination. For example, a merchandiser can control the content of a ¾ width banner based on an ad group parameter that has a value of "Spring Sale". FIG. 14 provides a flow diagram of a method of allowing third parties to purchase control of content on a Web page using dynamic slots.

In step 1400, a business team assigns pricing to each of the zones and parameter values in the zones. This pricing can be fixed or can be based on an auction model where merchandisers bid for control of certain slot, parameter, and value combinations. At step 1404, a request for a combination of a slot type, parameter and value is received. Note that the same slot type may be associated with different parameters by setting the zone after selecting a slot for a Web page definition. At step 1406, access is granted to upload content and create an inactive slot page definition that includes a selected trigger value for the parameter and the content ID for the uploaded content.

At step 1408, a business team member verifies the content and if the content meets standards set by the business team, activates the slot page definition at step 1410. At step 1412, the business team provides a URI link to the search engine 142 to ensure that the value that triggers the slot page definition appears in at least one URI link returned by the search engine. In accordance with some embodiments, if the value that triggers the slot page definition is not provided to the search engine, none of the URI links provided by the search engine will cause the content to be displayed in the slot. Specifically, the user's search terms and search categories will not be enough to trigger the slot page definition such that the content of the slot page definition is included in the slot.

At step 1414, web server 100 records analytics that describe how often the content of the slot page definition has been returned in a Web page and at step 1416, the analytics are used to charge the merchandiser based on the pricing set at step 1400.

Figure 15:
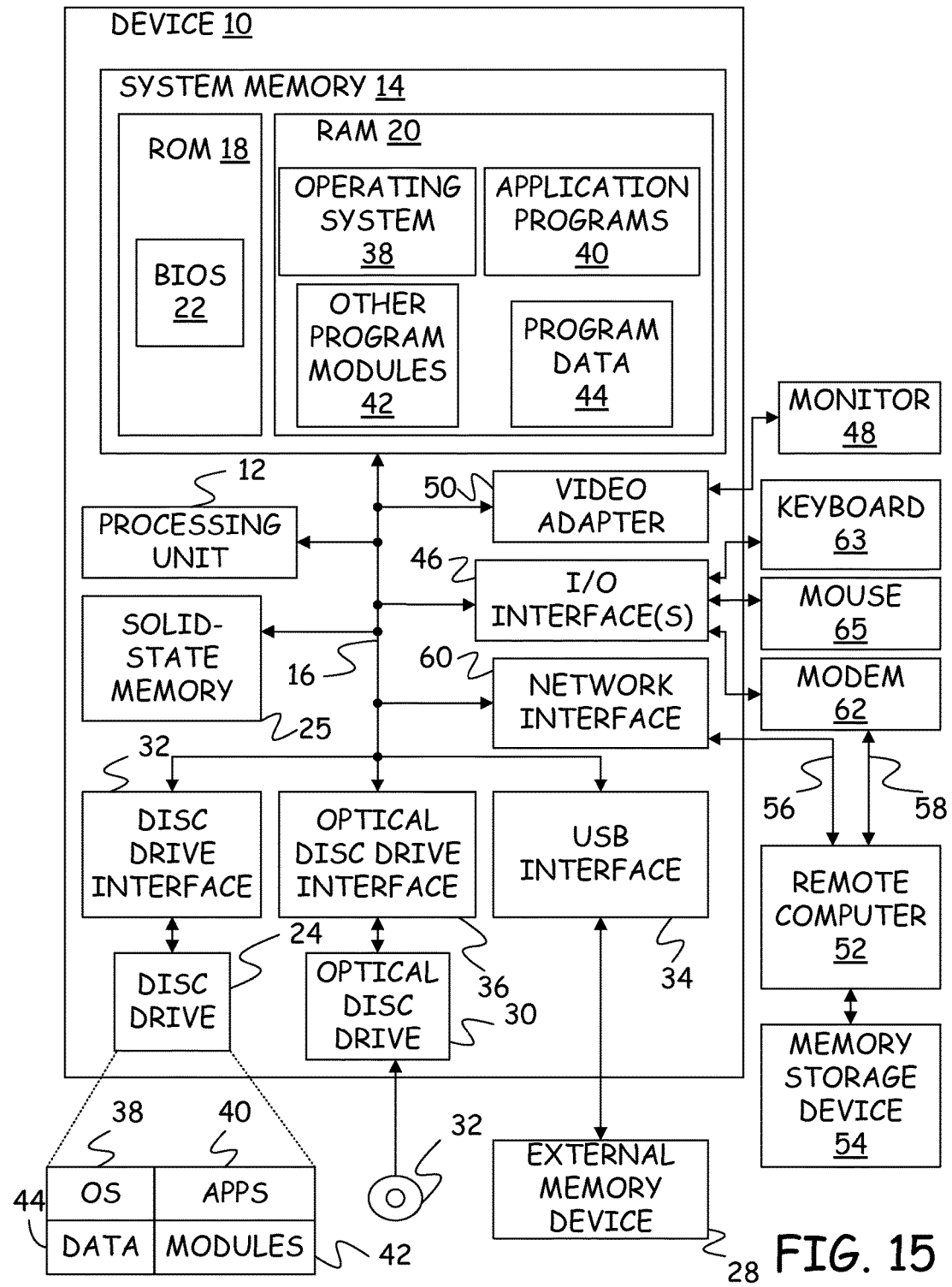
FIG. 15 is a block diagram of a computing environment that may be used in the various embodiments.

An example of a computing device that can be used as a server and/or client device and/or user computing device in the various embodiments is shown in the block diagram of FIG. 15. The computing device 10 of FIG. 15 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, a solid state memory 25, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives, solid state memory and external memory devices and their associated computer-readable media provide nonvolatile computer-readable storage media for computing device 10 on which computer-executable instructions and computer-readable data structures may be stored. Other types of media that are readable by a computer may also be used in the exemplary operation environment.

A number of program modules may be stored in the drives, solid state memory 25 and RAM 20, including an operating system 38, one or more application programs 40, other program modules 42 and program data 44. For example, application programs 40 can include instructions representing page assembler 154, page search 156, web page creation module 110 and slot page creation module 116. Program data 44 can include cartridges 104, intermediate cartridge templates 106, landing page templates 108, web page definitions 114, slot zones 102, slot page definitions 120, fixed slot content 158, ad content 160, user-based suggestions 162, search term suggestions 164, product search content 166, and the various user interfaces described above.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

Computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 15. The network connections depicted in FIG. 15 include a local area network (LAN) 56 and a wide area network (WAN) 58. Such network environments are commonplace in the art.

Computing device 10 is connected to the LAN 56 through a network interface 60. Computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 15 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving a first search results Web page having a first search results item link for a second Web page, the first search results item link is associated with a first uniform resource identifier used to make a request for the second Web page when the first search results item link is activated, the first uniform resource identifier including at least two key-value pairs as part of the first uniform resource identifier, the first uniform resource identifier being generated by a search engine in response to the search engine receiving a first search, the at least two key-value pairs including a first key-value pair and a second key-value pair;
upon activation of the first search results item link on the first search results Web page, retrieving by a processor a definition of the second Web page based on at least the first key-value pair, the definition of the second Web page comprising multiple sections, wherein at least one section of the multiple sections of the second Web page is associated with a key of the second key-value pair;
using the key of the second key-value pair to select a set of section objects that each have content that can be placed in the at least one section of the multiple sections of the second Web page that is associated with the key of the second key-value pair;
searching the set of section objects for a section object that has been designated for the value of the second key-value pair, wherein the value of the second key-value pair corresponds to only one of the set of section objects and the set of section objects includes a plurality of section objects;
locating a section object during the search of the set of section objects designated for the value of the second key-value pair and placing content defined for the located section object in the at least one section of the multiple sections of the second Web page that is associated with the key of the second key-value pair; and
returning the second Web page comprising the content for the at least one section of the multiple sections of the second Web page.

2. The method of claim 1 further comprising identifying a further section in the definition of the second Web page associated with a third key, determining that the third key is not present in the first uniform resource identifier, and removing the further section from the second Web page.

3. The method of claim 1 wherein at least a second section is associated with a key of a third key-value pair of the first uniform resource identifier and wherein the method further comprises:
using the key of the third key-value pair to select a second set of section objects that can each be placed in the second section associated with the key of the third key-value pair;
searching the set of section objects for a section object that has been designated for the value of the third key-value pair;
if a section object is located during the search of the set of section objects for a section object that has been designated for the value of the third key-value pair, placing content defined for the located section object in the second section; and
wherein returning the second Web page further comprises returning the second Web page further comprising the content for the second section.

4. The method of claim 1 further comprising:
receiving at least two key-value pairs as part of a second uniform resource identifier, one of the at least two key-value pairs comprising a search term key and a search term;
searching for a definition of a third Web page based on at least one of the key-value pairs of the second uniform resource identifier other than the search term key and the search term;
failing to find a definition of the third Web page based on at least one of the key-value pairs of the second uniform resource identifier other than the search term key and the search term; and
returning a second search result Web page based on the search term.

5. The method of claim 4 wherein the second search result Web page is devoid of sections that have been selected based on key-value pairs in the second uniform resource identifier other than the search term key and the search term.

* * * * *